US011533340B2

(12) United States Patent
Panchalingam et al.

(10) Patent No.: US 11,533,340 B2
(45) Date of Patent: Dec. 20, 2022

(54) ON-DEMAND SECURITY POLICY PROVISIONING (71) Applicant: Cisco Technology, Inc., San Jose, CA (US)

(72) Inventors: Murukanandam Panchalingam, San Jose, CA (US); Umamaheswararao Karyampudi, Fremont, CA (US); Gianluca Mardente, San Francisco, CA (US); Aram Aghababyan, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 17/146,204

(22) Filed: Jan. 11, 2021

(65) Prior Publication Data
US 2021/0136124 A1 May 6, 2021

Related U.S. Application Data (63) Continuation of application No. 16/014,644, filed on Jun. 21, 2018, now Pat. No. 10,917,436.
(Continued)

(51) Int. Cl.
H04L 29/06 (2006.01)
H04L 12/24 (2006.01)
(Continued)

(52) U.S. Cl.
CPC .......... H04L 63/20 (2013.01); H04L 41/0806 (2013.01); H04L 41/0893 (2013.01);
(Continued)

(58) Field of Classification Search
CPC ... H04L 63/101; H04L 41/0895; H04L 63/20; H04L 41/0893; H04L 41/0806;
(Continued)

(56) References Cited

U.S. PATENT DOCUMENTS 8,261,317 B2  9/2012 Litvin et al.
8,280,944 B2  10/2012 Laadan et al.
(Continued)

FOREIGN PATENT DOCUMENTS

WO  2013159518 A1  10/2013
WO  2016204903 A1  12/2016

OTHER PUBLICATIONS

International Search Report and Written Opinion from the International Searching Authority, dated May 23, 2019, 12 pages, for corresponding International Patent Application No. PCT/US2019/023021.
(Continued)

Primary Examiner — Mohammad A Siddiqi
(74) Attorney, Agent, or Firm — Polsinelli (57) ABSTRACT Systems, methods, and computer-readable media for on-demand security provisioning using whitelist and blacklist rules. In some examples, a system in a network including a plurality of pods can configure security policies for a first endpoint group (EPG) in a first pod, the security policies including blacklist and whitelist rules defining traffic security enforcement rules for communications between the first EPG and a second EPG in a second pods in the network. The system can assign respective implicit priorities to the one or more security policies based on a respective specificity of each policy, wherein more specific policies are assigned higher priorities than less specific policies. The system can respond to a detected move of a virtual machine associated with the first EPG to a second pod in the network by dynamically provisioning security policies for the first EPG in the second pod and removing security policies from the first pod.

15 Claims, 7 Drawing Sheets

Related U.S. Application Data (60) Provisional application No. 62/645,429, filed on Mar. 20, 2018.

(51) Int. Cl.
*H04L 9/40* (2022.01)
*H04L 41/0806* (2022.01)
*H04L 41/12* (2022.01)
*H04L 41/0893* (2022.01)

(52) U.S. Cl.
CPC .............. *H04L 41/12* (2013.01); *H04L 63/00* (2013.01); *H04L 63/0227* (2013.01); *H04L 63/101* (2013.01)

(58) Field of Classification Search
CPC ..... H04L 63/0227; H04L 63/00; H04L 41/12; H04L 41/0897
See application file for complete search history.

(56) References Cited

U.S. PATENT DOCUMENTS

| | | | |
|---|---|---|---|
| 8,429,255 B1 | 4/2013 | Kamil et al. | |
| 8,813,209 B2 | 8/2014 | Bhattacharya et al. | |
| 10,348,677 B2* | 7/2019 | Das | H04L 61/2514 |
| 10,348,767 B1* | 7/2019 | Lee | H04L 63/0236 |
| 10,768,920 B2 | 9/2020 | Fontoura et al. | |
| 2009/0249438 A1* | 10/2009 | Litvin | H04L 63/0263 726/13 |
| 2010/0043068 A1 | 2/2010 | Varadhan et al. | |
| 2010/0054129 A1* | 3/2010 | Kuik | H04L 47/10 370/235 |
| 2011/0131384 A1 | 6/2011 | Henson | |
| 2013/0046884 A1 | 2/2013 | Frost et al. | |
| 2013/0232484 A1 | 9/2013 | Chieu et al. | |
| 2013/0263209 A1 | 10/2013 | Panuganty | |
| 2015/0063194 A1 | 3/2015 | Yang | |
| 2015/0207665 A1* | 7/2015 | Basso | H04L 63/101 709/223 |
| 2015/0229641 A1 | 8/2015 | Sun et al. | |
| 2016/0219048 A1 | 7/2016 | Porras et al. | |
| 2016/0359913 A1 | 12/2016 | Gupta et al. | |
| 2016/0378518 A1* | 12/2016 | Antony | G06F 9/5077 718/1 |
| 2017/0078330 A1 | 3/2017 | Sreeramoju | |
| 2017/0222873 A1 | 8/2017 | Lee et al. | |
| 2017/0353494 A1 | 12/2017 | Krinos et al. | |
| 2018/0048623 A1 | 2/2018 | Bansal et al. | |
| 2018/0227185 A1* | 8/2018 | Turner | H04L 63/104 |
| 2019/0173840 A1 | 6/2019 | Desai et al. | |
| 2019/0319855 A1 | 10/2019 | Barton et al. | |

OTHER PUBLICATIONS

Sadri et al., "Towards Migrating Security Policies along with Virtual Machines in Cloud," Dec. 2013, pp. 1-121.
Examination Report for European Application No. EP 19715623.5 dated May 2, 2022, 8 pages.

* cited by examiner

ON-DEMAND SECURITY POLICY PROVISIONING

CROSS REFERENCE TO RELATED APPLICATIONS

This application is a continuation of U.S. Non-Provisional patent application Ser. No. 16/014,644, filed Jun. 21, 2018, which claims the benefit of U.S. Provisional Patent Application No. 62/645,429, filed Mar. 30, 2018, the full disclosures of which are incorporated herein by reference in their entireties.

TECHNICAL FIELD

The present technology pertains to network configuration and security policy provisioning.

BACKGROUND

Computer networks are becoming increasingly complex, often involving low level as well as high level configurations at various layers of the network. For example, computer networks generally include numerous access policies, forwarding policies, routing policies, security policies, quality-of-service (QoS) policies, etc., which together define the overall behavior and operation of the network. Network operators have a wide array of configuration options for tailoring the network to the needs of the users. While the different configuration options available provide network operators some flexibility and control over the network, they also add to the complexity of the network. In many cases, the configuration process can become highly complex and the configuration policies can be difficult to manage, particularly in larger networks which may implement a higher volume of configuration policies and policy modifications. Not surprisingly, the network configuration process is increasingly error prone. In addition, troubleshooting errors and managing policies in a complex network can be extremely difficult.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

In one embodiment, security policies, included within contracts in some examples, including blacklist and whitelist rules defining traffic security enforcement for communication between endpoint groups (EPGs) within pods in a network may each be assigned a priority level corresponding to a specificity of each respective policy. When a move is detected of a virtual machine (VM) associated with an EPG from one pod to another pod, the security policies may be automatically provisioned in the other pod.

In some embodiments, the security policies, based on a network schema in some examples, may also be automatically removed from the first pod when no other VMs associated with the first EPG remain on the first pod after the migrating VM moves to the other pod. In some embodiments, the priority levels may also be overridden and, furthermore, network may be a software-defined network (SDN) and the pods may be part of network fabric segments in the SDN. In some embodiments, the contracts also include definitions for EPGs and associated contexts, subjects, filters, sources, destinations, and the like.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Software-defined networks (SDNs), such as application-centric infrastructure (ACI) networks, can be managed and configured from one or more centralized network elements, such as application policy infrastructure controllers (APICs) in an ACI network or network managers in other SDN networks. A network operator can define various configurations, objects, rules, etc., for the SDN network, which can be implemented by the one or more centralized network elements. The configuration information provided by the network operator can reflect the network operator's intent for the SDN network, meaning, how the network operator intends for the SDN network and its components to operate. Such user intents can be programmatically encapsulated in logical models stored at the centralized network elements. The configuration can be based on the object and policy universe (e.g., endpoints, tenants, endpoint groups, networks or contexts, application profiles, services, domains, policies, etc.) defined for the particular SDN network solution.

The SDN network configuration can include a combination of rules and policies implemented by the network operator to secure the network and control access to network resources and manage network traffic. The rules and policies can include access control lists (ACLs), firewall rules, traffic policies, etc. In some cases, networks can have tens of thousands of ACLs and/or firewalls rules that are manually configured or pre-provisioned by a network operator. The ACLs and firewall rules can be implemented in a blacklist model, which allows all traffic unless otherwise specified by a deny rule, or a whitelist model which permits only traffic specifically allowed by a permit rule. Blacklist-based deny rules specifically define what traffic is not permitted in the network, and whitelist-based permit rules specifically define what traffic is permitted in the network.

In some configurations, the network operator can provision a mix of blacklist-based deny rules and whitelist-based permit rules for greater granularity and control. When both blacklist-based deny rules and whitelist-based permit rules are specified in the network, the network operator may define priorities for the rules, which can dictate the order in which rules are processed and determine how overlapping or conflicting rules are processed. The combination of different types of rules and priorities can lead to significant operational and management complexity. As a result, network operators may in some cases fail to remove unwanted rules or ACLs in a timely fashion when applications are decommissioned, and in other cases the network operators may otherwise retain such unwanted rules or ACLs due to uncertainty about the potential impact on the network of removing such rules. However, such mismanagement of unwanted rules or ACLs and associated priorities can lead to security breaches and vulnerabilities.

Given the increasing amount of security threats faced by networks and the potential harm and cost of network security breaches, many SDN network solutions follow a zero trust security approach based on the whitelist-model, where traffic is not allowed between entities unless there is an explicit permit rule enabling such traffic between the entities. While this whitelist model is generally more secure than the alternative blacklist model, the whitelist security approach can lead to rules explosion in certain deployments, particularly where Enterprises have requirements and only know what to be disallowed or blacklisted, rather than what needs to be allowed.

Moreover, ACL provisioning is generally static, and SDN solutions lack adequate support and flexibility for handling mobile workloads due to VM mobility. The approaches set forth herein provide a flexible, on-demand/dynamic security provisioning model with blacklist and whitelist rules and implicit priority management. These approaches can be implemented with any SDN solution (e.g., ACI datacenters and any cloud solution).

Disclosed herein are systems, methods, and computer-readable media for flexible, on-demand/dynamic security provisioning model in a network, with blacklist and whitelist rules and implicit priority management. In some examples, a system in a network including a plurality of pods can configure one or more security policies for a first endpoint group (EPG) in a first pod, the one or more security policies including blacklist and whitelist rules defining traffic security enforcement rules for communications between the first EPG and one or more second EPGs in one or more second pods in the network. The system can assign respective implicit priorities to the one or more security policies based on a respective specificity of each policy, wherein more specific policies are assigned higher priorities than less specific policies. The system can detect a move of a virtual machine associated with the first EPG from the first pod to a second pod from the one or more second pods in the network and, in response to the move, dynamically provision the one or more security policies for the first EPG in the second pod and/or remove at least one of the one or more security policies from the first pod.

Description of Example Embodiments

Figure 6:
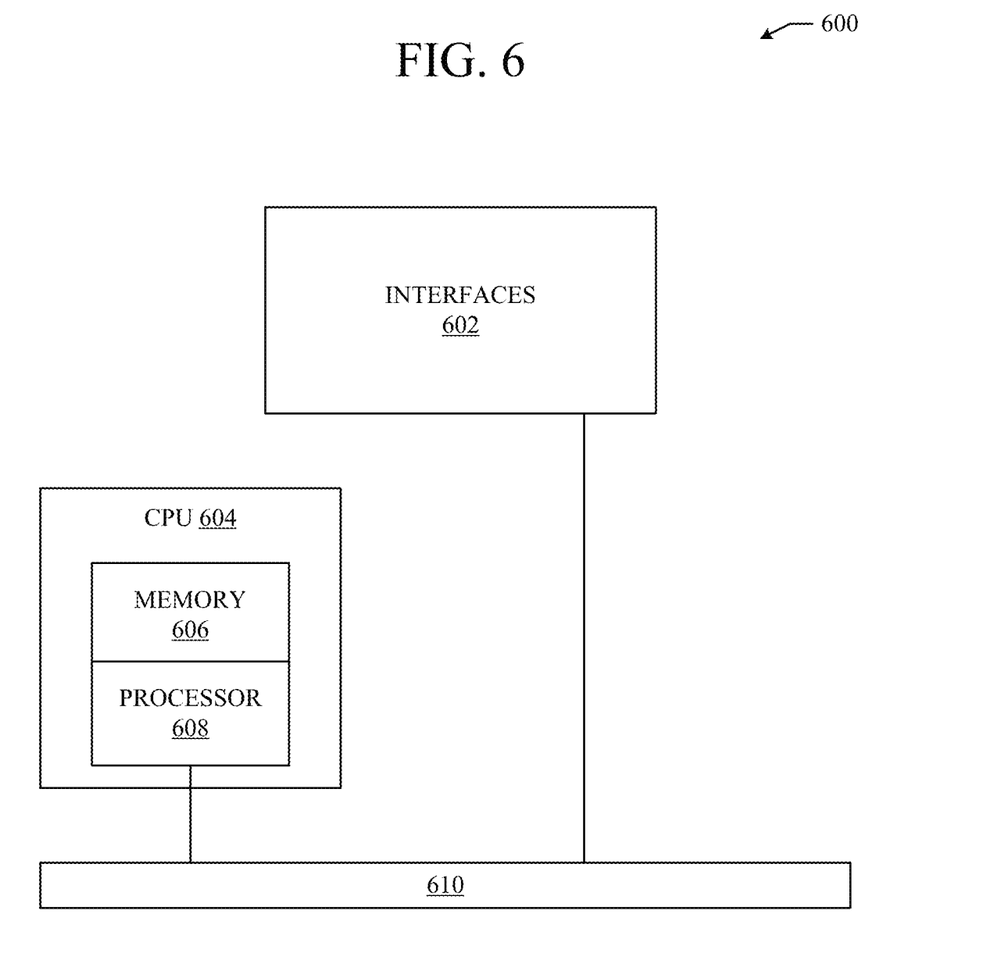
FIG. 6 illustrates an example network device.
Figure 7:
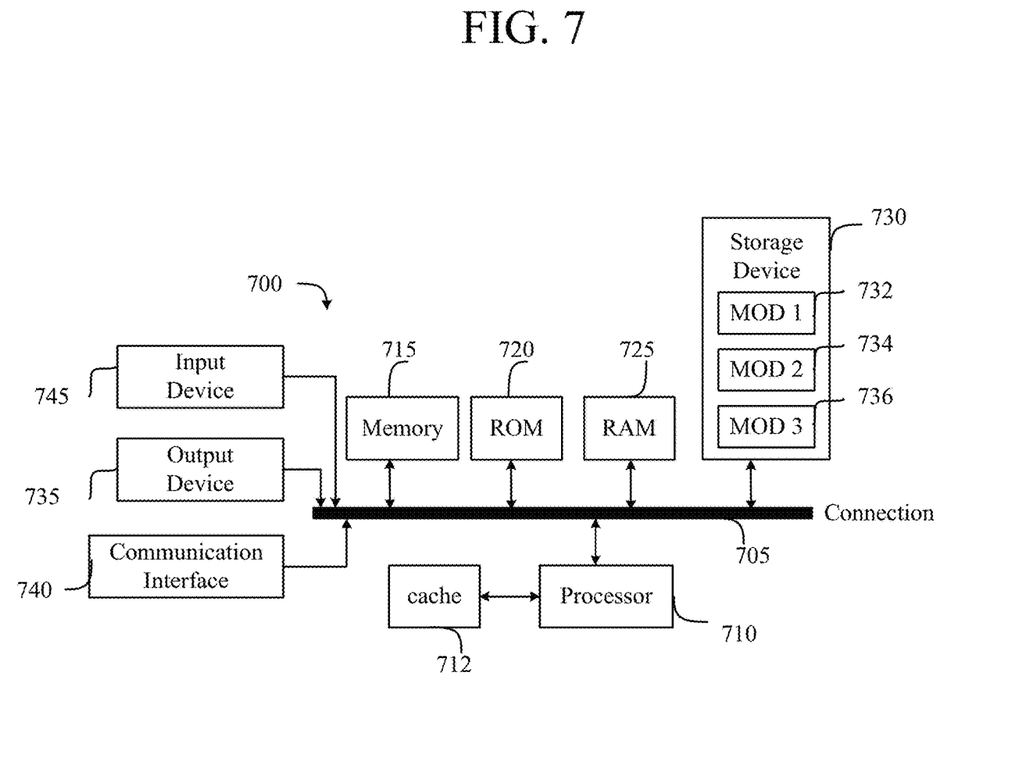
FIG. 7 illustrates an example computing device.

The disclosed technology addresses the need in the art for flexible, on-demand security provisioning models. The present technology involves system, methods, and computer-readable media for flexible, on-demand/dynamic security provisioning model with blacklist and whitelist rules and implicit priority management. The present technology will be described in the following disclosure as follows. The discussion begins with an introductory discussion of on-demand security provisioning with blacklist rules and whitelist rules as well as priority management. A discussion of example network environments, on-demand security provisioning approaches, and workload mobility, as shown in FIGS. 1-5 will then follow. The discussion concludes with a description of example network and computing devices, as illustrated in FIGS. 6 and 7, including example hardware components suitable for hosting software and performing computing operations.

The disclosure now turns to a discussion of network security models and provisioning approaches.

An Application-Centric Infrastructure ("ACP") Security Policy Model, particularly for software defined networks ("SDN"), may define various constructs, including endpoint groups ("EPG") and contracts. An EPG is a collection of endpoints (e.g., virtual machines ("VM"), containers, servers, devices, and the like) that have common policies. Communication between endpoints within a shared EPG is considered to be trusted and can be allowed by default. In some examples, security enforcement may be applied to only traffic between EPGs. Hence, EPGs serve as the security enforcement domain for ACI networks.

Contracts are policy rules that specify the way that communication occurs between EPGs within an ACI network and can be installed to, for example, switch within a pod. Contracts can include a whitelist security model (e.g., a regular contract), which details permitted communications for an EPG, and/or a blacklist model (e.g., a taboo contract), which details prohibited communications for an EPG. For example, a contract with a whitelist security model may include a rule permitting EPG 1 to receive communications from EPG 2 while, at the same time, a blacklist model of the contract may prohibit communications to EPG 1 from EPG 3. In effect, contracts provide an abstraction for enabling network operators to specify EPG security rules.

Further, contracts can conform to a provider-consumer model and thus may also specify a provider (e.g., an EPG or port and the like) and a consumer (e.g., another EPG or port and the like). A provider can represent an EPG which is providing a service, such as a hypertext transfer protocol ("HTTP") Server (e.g., TCP port 80). A consumer can represent an EPG which is consuming a service, such as a domain name service ("DNS"). In one example, a contract can include filters which themselves include entries. The entries may be equivalent to, for example, a line in access control list ("ACL") which is applied to a switch. Below is an illustrative example.

A provider, P1, may offer an HTTP service, and so P1 may leave a socket open on TCP port 80 awaiting connection. Further, there may be, for example, three different consumers for the HTTP service: C1, C2, and C3. In order to allow C1, C2, and C3 to communicate with P1 (e.g., connect to P1's IP and TCP port 80), typically there must be explicit permissions (e.g., access control lists ("ACL") and the like) such as:

Rule 1 (R1): C1→P1 TCP Destination Port 80, Permit, Priority High;

Rule 2 (R2): C2→P1 TCP Destination Port 80, Permit, Priority High;

Rule 3 (R3): C3→P1 TCP Destination Port 80, Permit, Priority High.

Another provider, P2, may offer a DNS service (e.g., UDP Port 53), for which a contract defines that any consumer can reach P2. To allow this, the ACLs need to include a rule such as:

Rule 4 (R4): any(*)→P2 UDP Destination Port 53, Permit, Priority Medium.

In the network device (e.g., a switch), these rules are installed in hardware, such as a ternary content-addressable memory ("TCAM") on the network device. In TCAM, the most specific rules (e.g., R1, R2 and R3) can be installed high in the TCAM (e.g., in a higher address space). As a result, the ACI network and/or the network device may implicitly assign a "High" priority to more specific rules, reflecting the higher install location in TCAM. In comparison, less specific rules (e.g., R4) can be installed below the high priority rules in the TCAM. In effect, this construction enables rules to be sequentially checked from the top of the TCAM down to the bottom of the TCAM—where the least specific rule may be installed (e.g., a default rule).

When blacklist rules are implemented in addition to the foregoing whitelist rules, the blacklist rules follow the same model as whitelist rules with regard to rule priority. Conflicts between rules may be resolved as follows, irrespective of which configuration is involved: most specific rule wins and, when there is a tie, DENY rules win over PERMIT rules. However, where a more permissive ACI is desired, PERMIT rules can be configured to win over DENY rules in the event of a tie.

Table 1, below, provides an example scheme for determining a level of specificity of a configuration for virtual routing and forwarding instances (VRF):

TABLE 1

| | SCOPE | SOURCE | DESTINATION | FILTER |
|---|---|---|---|---|
| 1 | VRF | Source EPG | Destination EPG | Filter |
| 2 | VRF | Source EPG | Destination EPG | * |
| 3 | VRF | Source EPG | * | Filter |
| 4 | VRF | * | Destination EPG | Filter |
| 5 | VRF | * | * | Filter |
| 6 | VRF | * | * | * |

In Table 1, case 1 is the most specific rule and therefore is assigned a highest priority (and, for example, installed at the top of a TCAM), whereas case 5 is the least specific rule and is therefore assigned a lowest priority (and, for example, installed at the bottom of the TCAM). This allows implicit priorities to be assigned and/or installed to TCAM for each and every rule based on specificity. In effect, a user (e.g., a systems administrator or other IT professional and the like) may provide a rule of a desired specificity without needing to at the same time directly assign a priority level to the rule.

Below is an example use case for blacklist rules with simplified priority management:

DENY SSH and Telnet for traffic between any to any EPG.

This will translate to the rule: any(*)→any(*), Filters SSH and TELNET DENY, Default Priority Low. In some examples, a parser or other process can translate the rule, as will be understood by a person having ordinary skill in the art.

Because this rule is less specific than cases 1-4 of Table 1, the rule may be of type 5 (e.g., case 5) in the example Table 1. Accordingly, this rule would be assigned (e.g., implicitly) a low priority and be installed to the bottom of the TCAM.

However, in some cases, the network operator may want this less specific blacklist rule to have a higher priority so it is executed/enforced over other rules. For example, the network operator may want this rule to be assigned a highest priority. Accordingly, the security model herein can allow the network operator to override the default implicit priority to any other priority, such as high, medium or low. This override feature can be enabled through an override configuration element, such as a dial or knob. In some cases, such override feature may be provided only for deny or blacklist rules. This approach can provide a whitelist model for defining permit rules with the ability to also define deny rules that are assigned implicit priorities with an option to override the default priorities and define a custom priority.

As a result, a network operator may have flexibility to override priorities for some rules while priorities for other rules remain intact. For example, priorities for deny or blacklist rules can be overridden, while permit or whitelist rule priorities remain fixed, thus providing operational simplicity when adding blacklist rules.

Figure 1:
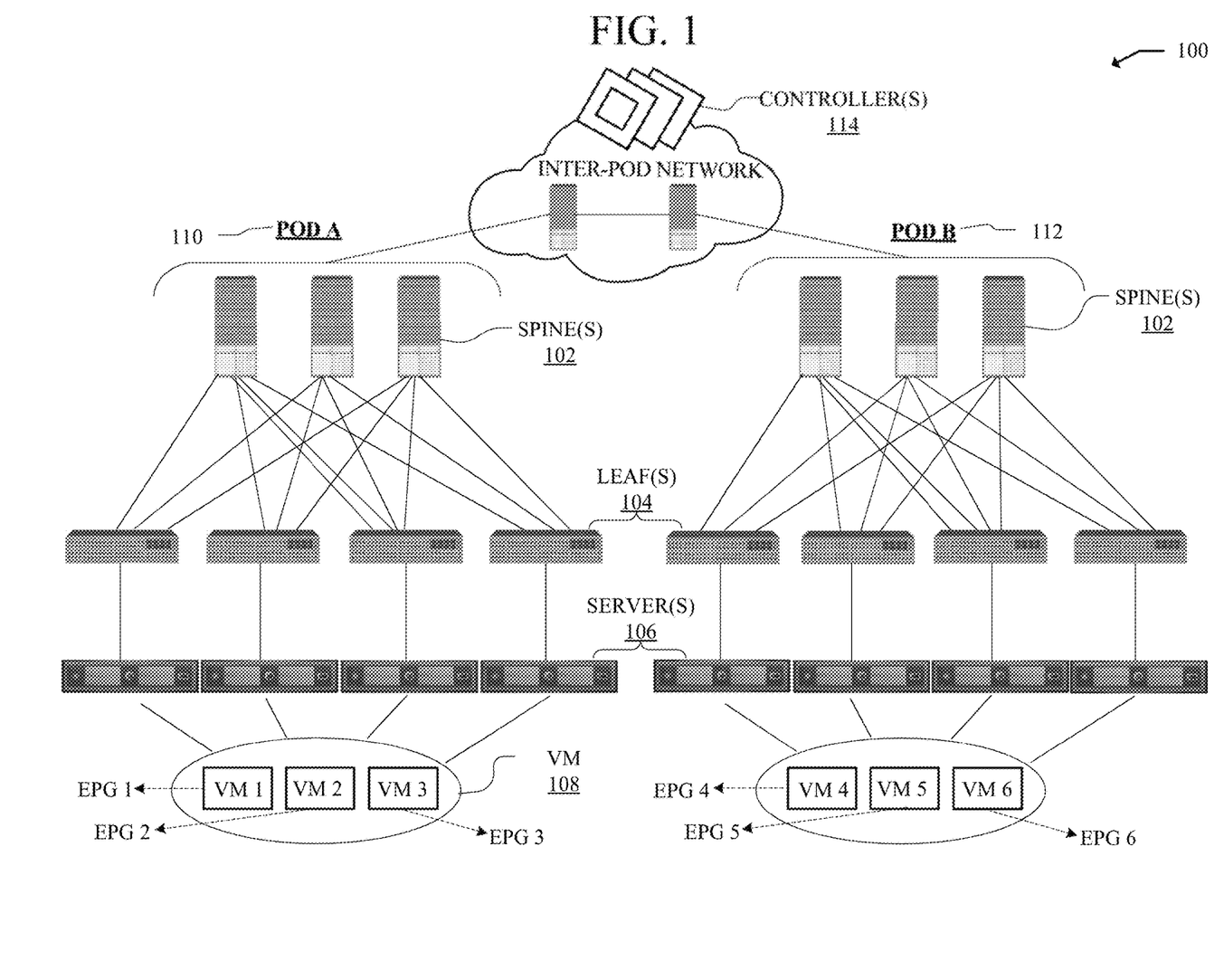
FIG. 1 illustrates an example network environment.

FIG. 1 illustrates an example network environment 100 for on-demand security provisioning using whitelist and blacklist rules with implicit priority management. The network environment 100 can include a fabric which represents the physical layer or infrastructure (e.g., underlay) of the network environment 100. The fabric can be segmented into POD A (110) and POD B (112), which include respective Spines 102 (e.g., spine routers or switches) and Leafs 104 (e.g., leaf routers or switches) interconnected for routing or switching traffic in the fabric of the network environment 100. In the example of FIG. 1, POD A (110) includes VM 1, VM 2, and VM 3, which respectively host EPG 1, EPG 2, and EPG 3. POD B (112) includes VM 4, VM 5, and VM 6, which respectively host EPG 4, EPG 5, and EPG 6.

Spines 102 can interconnect Leafs 104 in the PODs 110, 112, and Leafs 104 can connect the fabric to an overlay or logical portion of the network environment 100, which can include Servers 106 hosting endpoints, services and/or applications, such as VMs (Virtual Machines) 108. Thus, network connectivity in the fabric can flow from Spines 102 to Leafs 104, and vice versa. The interconnections between Leafs 104 and Spines 102 can be redundant (e.g., multiple interconnections) to avoid a failure in routing. In some configurations, Leafs 104 and Spines 102 can be fully connected, such that any given Leaf is connected to each of the Spines 102, and any given Spine is connected to each of the Leafs 104. Leafs 104 can be, for example, top-of-rack ("ToR") switches, aggregation switches, gateways, ingress and/or egress switches, provider edge devices, and/or any other type of routing or switching device.

Leafs 104 can be responsible for routing and/or bridging tenant or customer packets and applying network policies or rules. Network policies and rules can be driven by one or more Controllers 114 (e.g., CISCO Application Policy Infrastructure Controller or APIC), and/or implemented or enforced by one or more devices, such as Leafs 104. Leafs 104 can connect elements such as Servers 106 and VMs 108 to the fabric. Such elements can reside in one or more logical or virtual layers or networks, such as an overlay network. In some cases, Leafs 104 can encapsulate and decapsulate packets to and from such elements (e.g., Servers 106 or VMs 108) in order to enable communications throughout the network environment 100 and fabric. Leafs 104 can also provide any other devices, services, tenants, or workloads with access to the fabric. In some cases, Servers 106 connected to Leafs 104 can similarly encapsulate and decapsulate packets to and from Leafs 104. For example, Servers 106 can include one or more virtual switches or routers or tunnel endpoints for tunneling packets between an overlay or logical layer hosted by, or connected to, Servers 106 and an underlay layer represented by the fabric and accessed via Leafs 104.

Example applications hosted by the Servers 106 or VMs 108 can include software applications, services, containers, appliances, functions, service chains, etc. For example, applications can include a firewall, a database, a CDN server, an IDS/IPS, a deep packet inspection service, a message router, a virtual switch, a web server, etc. An application can be distributed, chained, or hosted by multiple endpoints (e.g., Servers 106, VMs 108, etc.), or may run or execute entirely from a single endpoint.

VMs 108 can be virtual machines hosted on Servers 106. VMs 108 can include workloads running on a guest operating system on a respective server. Hypervisors can provide a layer of software, firmware, and/or hardware that creates, manages, and/or runs the VMs 108. Hypervisors can allow VMs 108 to share hardware resources on Servers 106, and the hardware resources on Servers 106 to appear as multiple, separate hardware platforms. Moreover, hypervisors on Servers 106 can host one or more VMs 108.

In some cases, one or more Servers 106 and/or VMs 108 can represent or reside in a tenant or customer space. Tenant space can include workloads, services, applications, devices, networks, and/or resources that are associated with one or more clients or subscribers. Accordingly, traffic in network environment 100 can be routed based on specific tenant policies, spaces, agreements, configurations, rules, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 114, Servers 106, Leafs 104, etc.

Configurations in the network environment 100 can be implemented at a logical level, a hardware level (e.g., physical), and/or both. For example, configurations can be implemented at a logical and/or hardware level based on endpoint or resource attributes, such as endpoint types and/or application groups or profiles, through an SDN framework (e.g., Application-Centric Infrastructure (ACI) or VMWARE NSX). To illustrate, one or more administrators can define configurations at a logical level (e.g., application or software level) through Controllers 114, which can implement or propagate such configurations through the network environment 100. For example, rules such as contracts or ACL rules can be defined on the Controllers 114, and propagated to Leafs 104, which then store or render the contracts or ACL rules on hardware (e.g., TCAM).

Such configurations can define rules, policies, priorities, protocols, attributes, objects, etc., for routing and/or classifying traffic in the network environment 100. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, filters, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in the network environment 100, such as Leafs 104, Servers 106, Controllers 114, etc.

In some configurations, an ACI-based SDN solution can provide an application-centric or policy-based model through scalable distributed enforcement. ACI supports integration of physical and virtual environments under a declarative configuration model for networks, servers, services, security, requirements, etc. For example, the ACI framework implements EPGs as previously described, which can include a collection of endpoints or applications that share common configuration requirements, such as security, QoS, services, etc. Endpoints can be virtual/logical or physical devices, such as VMs 108, containers, hosts or servers (e.g., 106) that are connected to the network environment 100. Security policy and configurations can be applied between EPGs, instead of endpoints directly, in the form of contracts. Leafs 104 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

Policies or rules can be defined for EPGs through contracts in the network environment 100. In some cases, policies or rules can be defined at the POD level, with POD A (110) having a respective set of policies or rules and POD B (112) also having a respective set of policies or rules.

To illustrate, assume EPG 5 provides DNS and NTP services, for which EPG 3 has a whitelist contract (WC 1), which enables EPG 3 to communicate with EPG 5 for such services. Similarly, assume EPG 3 is permitted to communicate with EPG 4, except SSH and TELNET traffic from EPG 3 to EPG 4 is denied through a configured blacklist contract (BC 1). This example configuration will result in the following security rules installed on the TCAM of Leafs 104 (Top Of Rack (TORs)) on Pod A (110).

Pod A Rules:
Rule 1 (R1): EPG3→EPG5, Filters DNS and NTP, Permit, Priority High;
Rule 2 (R2): EPG3→EPG4, Filters SSH and TELNET, Deny, Priority High;
Rule 3 (R3): EPG3→EPG4, Filters Any, Permit, Priority Medium;
Rule 4 (R4): Any→Any Filters *, Deny, Priority Low.

As illustrated above, R4 is the default low priority deny all rule installed in the security rules hardware table (e.g., TCAM), at the bottom. This ensures that if none of the higher priority rules apply to a packet, the packet is bound to match this rule and get dropped. R1 is the permit high-priority rule installed for the whitelist contract WC 1 between EPG 3 and EPG 5. In comparison, R2 is the deny high-priority rule installed for the blacklist contract BC 1 between EPG 3 and EPG 4, and R3 is the medium priority permit rule installed for the same contract BC 1.

With workload mobility (e.g., VM mobility), when endpoints are migrated, the ACI network can ensure that security policies travel with endpoints, and wherever the associated EPG is dynamically deployed, the relevant security policies are provisioned on-demand on the connected Leafs (e.g., TOR switches). Same approach can be implemented when applications: the relevant security policies are automatically removed from the Leafs or TORs thereby guaranteeing the security posture.

Figure 2:
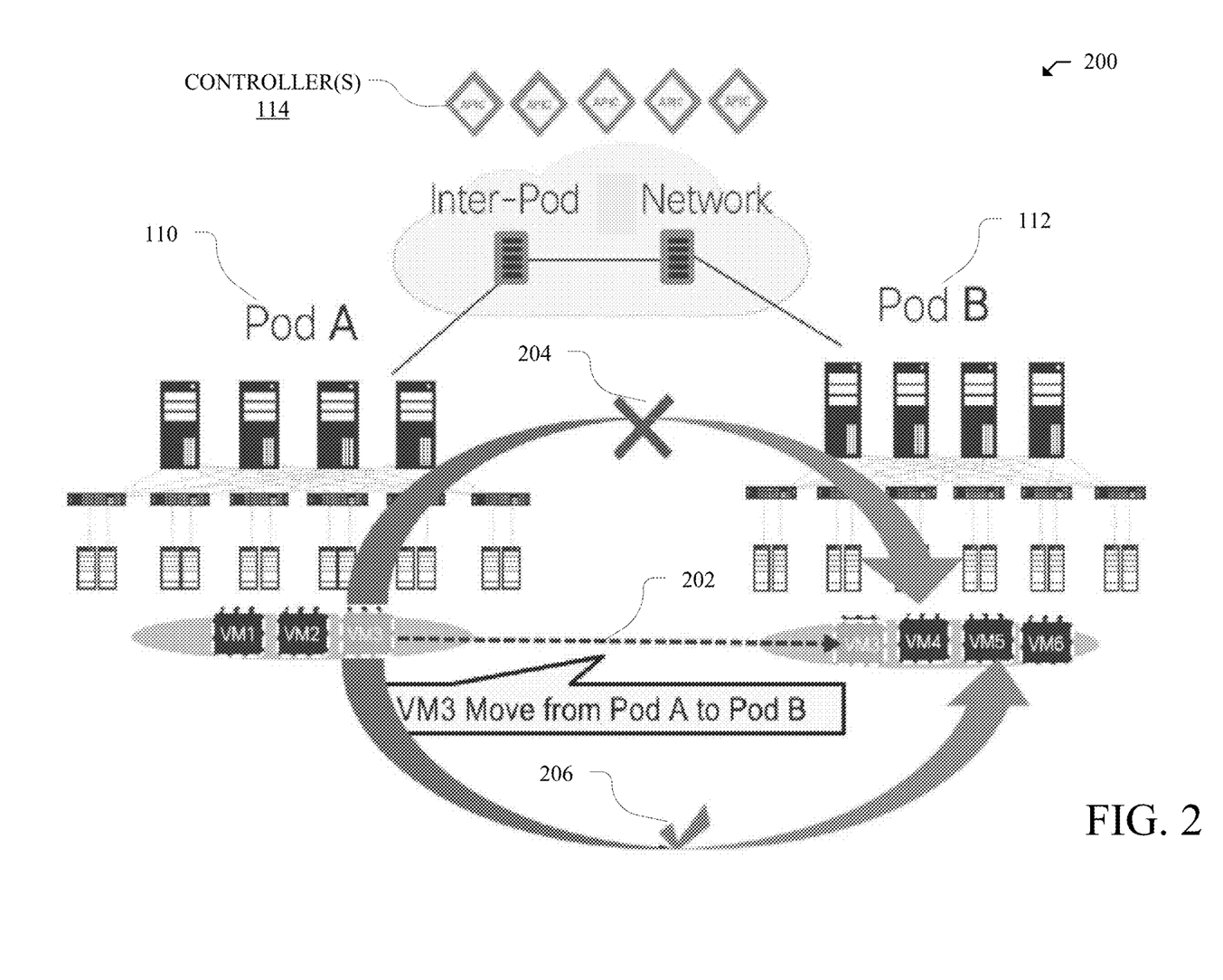
FIG. 2 illustrates an example scenario for on-demand provisioning of whitelist and blacklist rules in the example network environment of FIG. 1.

FIG. 2 illustrates an example on-demand provisioning scenario 200 based on the deployment example described in FIG. 1, including the POD A (110) rules illustrated above. The example on-demand provisioning scenario 200 illustrates VM 3 being moved (202) from POD A (110) to POD B (112).

When VM 3 belonging to EPG 3 moves from Pod A (110) to Pod B (112), the rules (i.e., R1, R2, R3) defined for EPG 3 in POD A (110) will be dynamically re-provisioned in POD B (112) and removed from POD A (110), as follows.

Pod A Rules:
Rule 1 (R1): EPG3→EPG5, Filters DNS and NTP, Permit, Priority High (no longer needed and hence will be deleted);
Rule 2 (R2): EPG3→EPG4, Filters SSH and TELNET, Deny, Priority High (no longer needed and hence will be deleted);
Rule 3 (R3): EPG3→EPG4, Filters Any, Permit, Priority Medium (no longer needed and hence will be deleted);
Rule 4 (R4): Any→Any Filters *, Deny, Priority Low.

Pod B Rules:
Rule 5 (R5): EPG3→EPG5, Filters DNS and NTP, Permit, Priority High; Rule 6 (R6): EPG3→EPG4, Filters SSH and TELNET, Deny, Priority High; Rule 7 (R7): EPG3→EPG4, Filters Any, Permit, Priority Medium; Rule 8 (R8): Any→Any Filters *, Deny, Priority Low.

Note that in the TCAM, the higher priority rules are installed at the top of the TCAM, while medium priority rules are in the middle of the TCAM and low priority rules are in the bottom of the TCAM. Accordingly, the security posture is always guaranteed for the rules even with such on-demand dynamic provisioning.

As illustrated above, the approaches herein provide on-demand provisioning of both whitelist and blacklist rules and timely automatic removal on application withdrawal. The network operator is not required to provide priorities for the rules, thereby simplifying operations and reducing misconfiguration risks. However, an added configuration option (e.g., a knob) is provided to allow the network provider to override the default, implicit priority for blacklist deny rules, giving added operational simplicity. Security audits can be done at a single place, such as the Controller 114, factoring in both the whitelist and blacklist contracts. This way, network operators may reap the full benefits of on-demand/dynamic security provisioning with both whitelist and blacklist rules.

Figure 3:
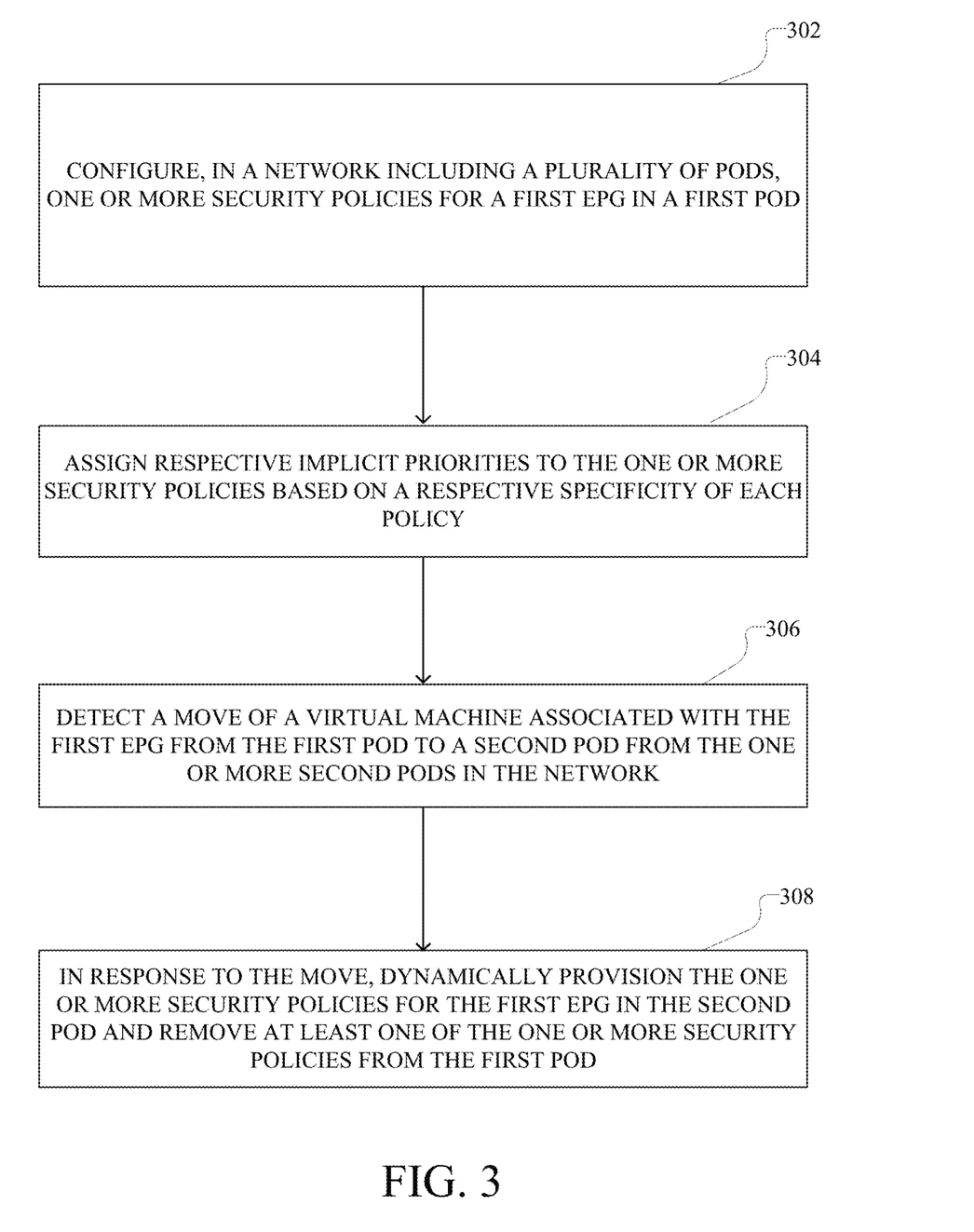
FIG. 3 illustrates an example method for on-demand provisioning.

The disclosure now turns to FIG. 3, which illustrates an example method for configuring and managing policies and policy priorities in a network environment (e.g., network environment 100). While the example method is illustrated with a particular order of blocks or steps, those of ordinary skill in the art will appreciate that FIG. 3, and the blocks shown therein, can be executed in any order and can include fewer or more blocks than illustrated.

Each block shown in FIG. 3 represents one or more steps, processes, methods or routines in the methods. For the sake of clarity and explanation purposes, the blocks in FIG. 3 are described with reference to Controller 114 and Network Environment 100, as shown in FIG. 1.

At step 302, controller 114 in network environment 100 can configure one or more security policies (e.g., R1, R2, R3, R4) for a first endpoint group (EPG) (e.g., EPG 3) in a first pod (e.g., POD A). The one or more security policies can include blacklist and whitelist rules defining traffic security enforcement rules for communications between the first EPG and one or more second EPGs (e.g., POD B) in one or more second pods in the network environment 100.

At step 304, the controller 114 can assign respective implicit priorities to the one or more security policies based on a respective specificity of each policy (e.g., Table 1). For example, more specific policies can be assigned higher priorities than less specific policies. In some examples, the switch (e.g., leaf 104) may assign the respective implicit priorities instead of, or alongside, the controller 114.

At step 306, the controller 114, or in some examples the leaf 104, can detect a move of a virtual machine (e.g., VM 3) associated with the first EPG from the first pod to a second pod from the one or more second pods in the network environment 100. At step 308, the controller 114 can, in response to the move, dynamically provision the one or more security policies for the first EPG in the second pod and/or remove at least one of the one or more security policies from the first pod.

In some examples, the provisioning of the one or more policies for the first EPG in the second pod may be triggered when the VM moves between either pods or EPGs. The triggering may occur via, for example, a monitoring service or the like. Similarly, in some examples, the movement of the VM may trigger the deletion of a rule via monitoring services and processes or the like.

Figure 4:
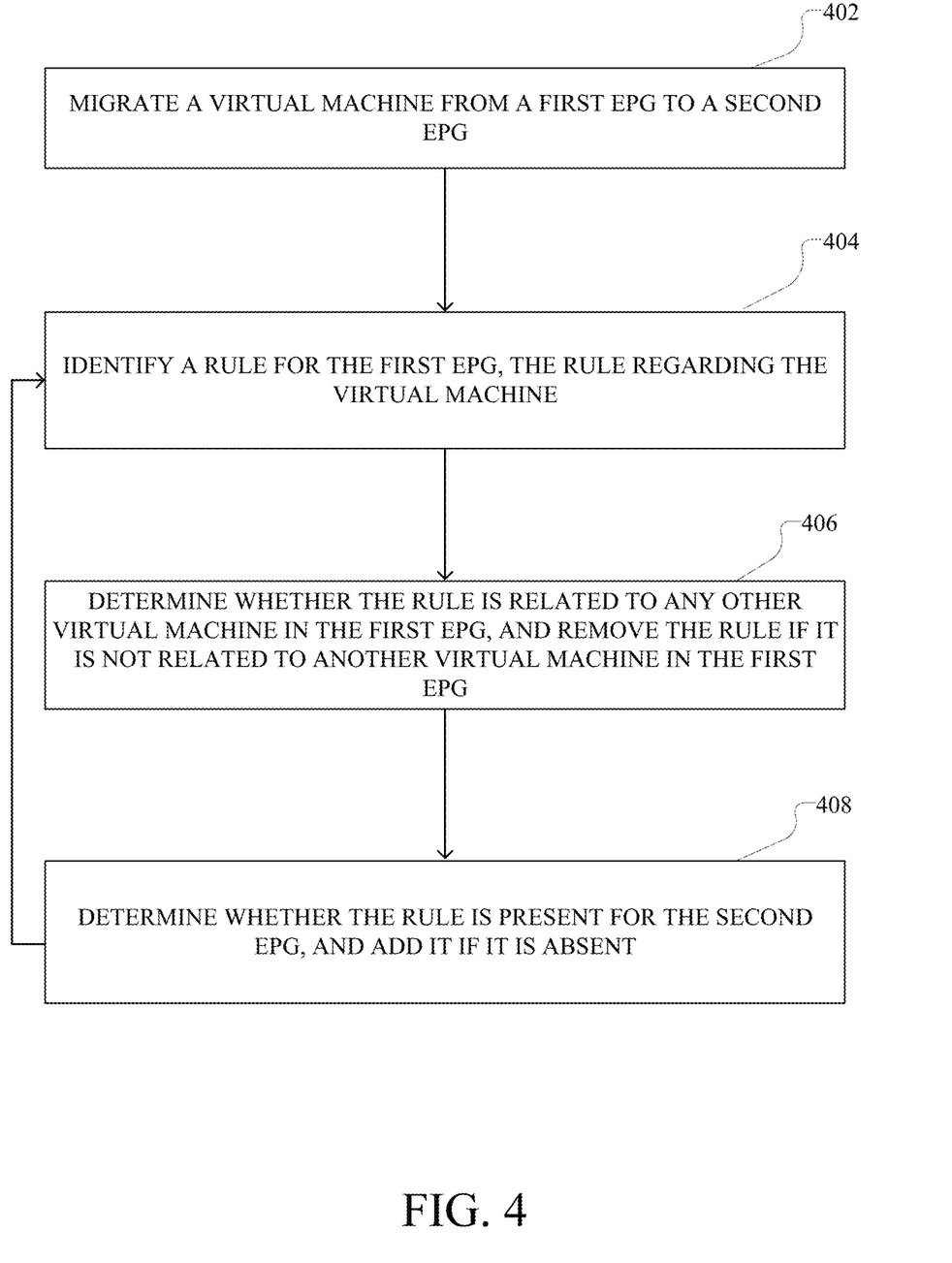
FIG. 4 illustrates another example method for on-demand provisioning.

FIG. 4 illustrates another example method for automatically maintaining security policies during a resource (e.g., a virtual machine) migration within a network. It is understood that while a virtual machine is discussed, any resource having security policies managed by an ACL or rule/policy abstraction (e.g., a contract, a security group, etc.) can be managed according to the illustrated method. Further, while the example method is illustrated with a particular order of blocks or steps, those of ordinary skill in the art will appreciate that FIG. 4, and the blocks shown therein, can be executed in various sequences and with fewer or more blocks than illustrated.

At step 402, a VM migrates from a first EPG to a second EPG. As discussed above in reference to FIG. 1, a pod (e.g., POD A 110, POD B 112, and the like) can include leafs 104 which may provide switching support (e.g., function as network switches) for linked servers 106 hosting various VMs 108, each of which may be members of one or more EPGs. In such an example, the migrating VM can migrate to another pod (e.g., from POD A 110 to POD B 112) in order to join the second EPG. Alternatively, the migrating VM may migrate to a second EPG within the same pod but controlled by a different leaf 104 and/or on a different server 106 than the first EPG.

At step 404, a rule for the first EPG and related to the migrating VM can be identified. In some examples, this identification can be accomplished by iterating through a TCAM in, for example, a leaf 104 controlling the first EPG. As discussed above, TCAM may store rules according to a priority level which, by default, may be assigned automatically based on the rule specificity. Accordingly, the TCAM can be reviewed starting from the top and iterated through in downward to lower memory addresses in order to check the most specific rules (e.g., most narrowly tailored to particular EPGs or VMs) first and the less specific (e.g., potentially connected to multiple EPGs or VMs) last. In other examples, various rules exploration schemes may be used, such as, without imputing limitation, parallelizable checking processes for different sections of TCAM and the like.

Nevertheless, at step 406, an identified rule may be processed to determine if it is related to any other VM in the first EPG and, if it is not related to any other VM (e.g., it is orphaned), then it can be removed or purged from, for example, the TCAM in which it is located. For example, as discussed above in reference to FIG. 2, a rule may be identified as being related to the first EPG which may include no other VM than the migrating VM. In such a case, the orphaned rule can be purged as the first EPG will now be empty and thus it is unnecessary to maintain it in the TCAM as it will no longer be invoked and would otherwise slow down switching operations that need to review each and every rule in the TCAM or potentially take up TCAM that could otherwise be used for enforceable rules.

Further, at step 408, the second EPG location can be checked for presence of the identified rule. If the rule is absent from the second EPG location, it may be added to ensure a smooth migration of the VM and avoid security issues created by the migration. As can be seen in FIG. 4, steps 404-408 may be repeated as many times as necessary to purge and/or install rules. In this way, a VM or other resource can be migrated from one EPG to another without a technician having to manually purge orphaned rules or install new rules.

Figure 5:
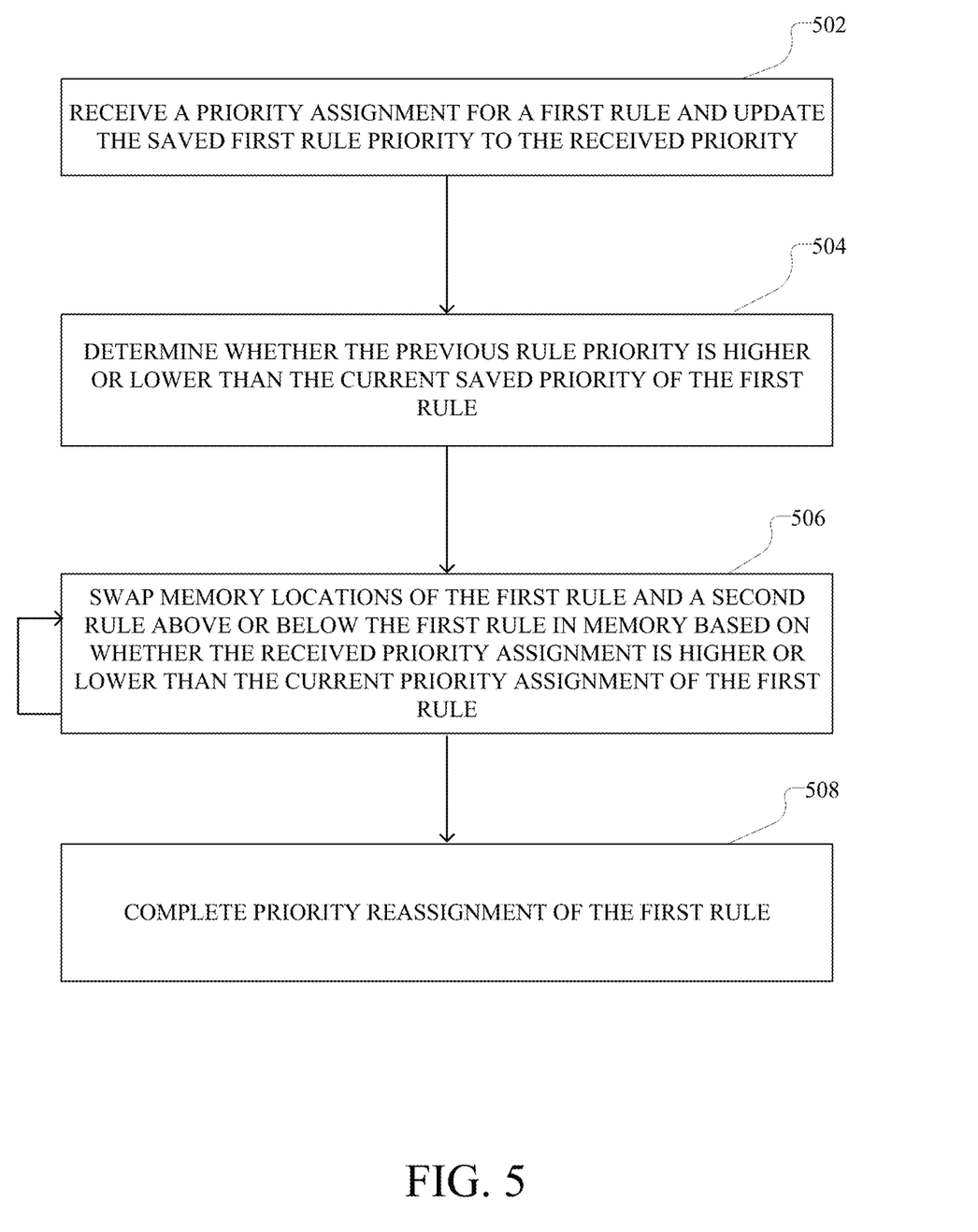
FIG. 5 illustrates an example method for customizing a rule priority.

FIG. 5 illustrates an example method for reassigning a priority level to a rule. As discussed above, in some examples, rules may be assigned an implicit priority level based on specificity of the rule. As a result of a rule priority, the rule may be installed higher or lower in the network device's hardware (e.g., TCAM) and thus may be checked against earlier or later, respectively, when communications between, for example, EPGs are processed. In some situations, an operator or the like may want to change a priority level of a rule. For example, an operator may want a less specific rule to be installed to the top of the TCAM and thus may increase the priority level of the rule. While three priority levels (e.g., high, medium, and low) are used in this disclosure, it will be understood by a person having ordinary skill in the art that any number of hierarchical priority levels can be used and that ordinality of priority levels may be defined in various ways.

In any case, in step 502, a priority assignment can be received for a first rule and priority associated with the first rule can be updated to the received priority. In some examples, the priority assignment can be received via a graphical user interface (GUI), command line interface (CLI), or the like. In other examples, the priority assignment may be received via, for example, an API endpoint from another system such as, without imputing limitation, an automated priority assignment system and the like. Further, the priority value for the rule can be saved in, for example, a contract or similar data object stored on, for example, a spine 102, leaf 104, or server 106.

In step 504, a comparison can be made to determine whether the newly assigned priority is higher or lower than the previous priority. The comparison may be made between the new priority level and, for example, a buffer or stored value denoting the most recent priority assignment. For example, while the newly assigned priority can be higher or lower than the previous priority, in some cases the priority may be the same, in which case, step 506 (discussed below) can be skipped as the rule will be stored in a correct section of the TCAM.

In step 506, if the new priority is higher than the old priority, the rule can swap memory locations with the rule above it in the hardware (e.g., TCAM). Alternatively, if the new priority is lower than the old priority, the rule can swap memory locations with the rule below in the hardware. As can be seen in FIG. 5, this step may repeat until the rule has been placed into an appropriate portion of the hardware (e.g., TCAM). For example, a medium priority rule, originally located in the middle of the medium priority section of the TCAM, can be assigned a new high priority. As a result, the rule will continue to swap with rules above it in the TCAM until it is below another rule having a medium priority, in which case it will stop relocating in memory.

In response to achieving an appropriate location in the hardware (e.g., TCAM), the priority reassignment of the rule can be completed at step 508. In some examples, this may generate an alert or the like to notify the operator, or be provided to a secondary system, that the priority reassignment has completed. In other examples, this may cause a report out or the like to be generated (e.g., as log file). In effect, the operator may reassign a priority level to a rule without having to manually interact with the TCAM and the like.

The disclosure now turns to FIGS. 6 and 7, which illustrate example network and computing devices, such as switches, routers, load balancers, client computers, and so forth. In some examples, contracts may be stored on switches, or leaves, within a pod (e.g., within an ACI and the like).

FIG. 6 illustrates an example network device 600 suitable for performing switching, routing, assurance, and other networking operations. Network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, TCAM, and the like) also forms part of CPU 604. However, there are many different ways in which memory could be coupled to the system. In some cases, the network device 600 can include a memory and/or storage hardware, such as TCAM, separate from CPU 604. Such memory and/or storage hardware can be coupled with the network device 600 and its components via, for example, connection 610.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing, switching, and/or other operations. The ASIC can communicate with other components in the network device 600 via the connection 610, to exchange data and signals and coordinate various types of operations by the network device 600, such as routing, switching, and/or data storage operations, for example.

FIG. 7 illustrates a computing system architecture 700 including components in electrical communication with each other using a connection 705, such as a bus. System 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method, comprising:
    detecting migration of a virtual machine (VM) from a first end point group (EPG) to a second EPG;
    identifying a rule for the first EPG that is associated with the VM;
    determining whether the rule is related to one or more other VMs in the first EPG;
    managing maintenance of the rule in the first EPG based on whether the rule is related to the one or more other VMs in the first EPG;
    removing the rule from the first EPG if the rule is unrelated to the one or more other VMs in the first EPG;
    determining whether the rule is present in the second EPG; and
    adding the rule to the second EPG if the rule is absent from the second EPG.

2. The method of claim 1, wherein the rule is identified by iterating through a plurality of rules of a network device controlling the first EPG.

3. The method of claim 2, wherein rules of the plurality of rules are ordered according to priority levels associated with the rules and the plurality of rules are iterated through according to an order of the rules of the plurality of rules.

4. The method of claim 2, wherein rules of the plurality of rules are iterated over according to a parallelizable checking process for different sections of the plurality of rules.

5. The method of claim 3, wherein the priority levels associated with the rules is based on a specificity of each of the rules to the first EPG.

6. The method of claim 3, wherein the priority levels associated with the rules are unique and specific to the first EPG.

7. The method of claim 3, wherein the rules are stored at specific locations in memory based on the priority levels associated with the rules.

8. A system comprising:
    one or more processors; and
    a non-transitory computer-readable medium comprising instructions stored therein, which when executed by the one or more processors, cause the one or more processors to:
        detect migration of a virtual machine (VM) from a first end point group (EPG) to a second EPG;
        identify a rule for the first EPG that is associated with the VM;
        determine whether the rule is related to one or more other VMs in the first EPG;
        manage maintenance of the rule in the first EPG based on whether the rule is related to the one or more other VMs in the first EPG;
        remove the rule from the first EPG if the rule is unrelated to the one or more other VMs in the first EPG;
        determine whether the rule is present in the second EPG; and
        add the rule to the second EPG if the rule is absent from the second EPG.

9. The system of claim 8, wherein the rule is identified by iterating through a plurality of rules of a network device controlling the first EPG.

10. The system of claim 9, wherein rules of the plurality of rules are ordered according to priority levels associated with the rules and the plurality of rules are iterated through according to an order of the rules of the plurality of rules.

11. The system of claim 9, wherein rules of the plurality of rules are iterated over according to a parallelizable checking process for different sections of the plurality of rules.

12. The system of claim 10, wherein the priority levels associated with the rules is based on a specificity of each of the rules to the first EPG.

13. The system of claim 10, wherein the priority levels associated with the rules are unique and specific to the first EPG.

14. The system of claim 10, wherein the rules are stored at specific locations in memory based on the priority levels associated with the rules.

15. A non-transitory computer-readable storage medium comprising instructions stored therein, which when executed by one or more processors, cause the one or more processors to:
   detect migration of a virtual machine (VM) from a first end point group (EPG) to a second EPG;
   identify a rule for the first EPG that is associated with the VM
   determine whether the rule is related to one or more other VMs in the first EPG;
   manage maintenance of the rule in the first EPG based on whether the rule is related to the one or more other VMs in the first EPG;
   remove the rule from the first EPG if the rule is unrelated to the one or more other VMs in the first EPG;
   determine whether the rule is present in the second EPG; and
   add the rule to the second EPG if the rule is absent from the second EPG.

\* \* \* \* \*